(12) United States Patent
Filev et al.

(10) Patent No.: US 10,740,788 B2
(45) Date of Patent: *Aug. 11, 2020

(54) CONTENT EXPOSURE INTERVAL BASED CONTENT ITEM DEPLOYMENT

(71) Applicant: Google Inc., Mountain View, CA (US)

(72) Inventors: Momchil Filev, Mountain View, CA (US); Martin Freund, Mountain View, CA (US)

(73) Assignee: Google LLC, Mountain View, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/632,924

(22) Filed: Jun. 26, 2017

(65) Prior Publication Data

US 2017/0293936 A1    Oct. 12, 2017

Related U.S. Application Data

(63) Continuation of application No. 13/532,209, filed on Jun. 25, 2012, now Pat. No. 9,767,479.

(51) Int. Cl.
*G06Q 30/00* (2012.01)
*G06Q 30/02* (2012.01)

(52) U.S. Cl.
CPC ......... *G06Q 30/0247* (2013.01); *G06Q 30/02* (2013.01); *G06Q 30/0275* (2013.01); *G06Q 30/0277* (2013.01)

(58) Field of Classification Search
CPC ........... G06F 11/1425; G06F 2209/505; G06F 9/5061; H04L 41/0893; H04L 67/1046
USPC .................................................. 709/205, 229
See application file for complete search history.

(56) References Cited

U.S. PATENT DOCUMENTS

| 6,044,347 | A  | 3/2000 | Abella et al. |
| 6,275,806 | B1 | 8/2001 | Pertrushin |
| 6,684,249 | B1 | 1/2004 | Frerichs et al. |
| 6,732,080 | B1 | 5/2004 | Blants |

(Continued)

FOREIGN PATENT DOCUMENTS

| JP | 2011-210238 | 10/2011 | | |
| JP | 2011210238 A | * 10/2011 | ............. | G06Q 20/00 |

(Continued)

OTHER PUBLICATIONS

Attention Economics Pricing in Advertising: Cost Per Second (Ad Traders // Tuesday, Oct. 19, 2010—12:09 am https://adexchanger.com/data-driven-thinking/attention-economics/) (Year: 2010).*
• Ad Traders. Attention Economics Pricing in Advertising: Cost Per Second. (Oct. 19, 2010). Retrieved online Mar. 24, 2020. https://adexchanger.com/data-driven-thinking/attention-economics/) (Year: 2010).*

(Continued)

*Primary Examiner* — James A Reagan
(74) *Attorney, Agent, or Firm* — Foley & Lardner LLP

(57) ABSTRACT

This specification describes technologies relating to content presentation. In general, one aspect of the subject matter described in this specification can be embodied in methods that include the actions of identifying advertisements that are candidates to be provided within an advertising slot of the content segment, determining, based on respective bids, and the exposure interval, which advertisement will generate greater revenue within the advertising slot, and, providing such an advertisement in the advertising slot. Other embodiments of the various aspects include corresponding systems, apparatus, and computer program products.

20 Claims, 9 Drawing Sheets

(56) References Cited

U.S. PATENT DOCUMENTS

| | | | |
|---|---|---|---|
| 6,857,007 B1 | 2/2005 | Bloomfield | |
| 6,907,566 B1 * | 6/2005 | McElfresh | G06Q 30/02 715/210 |
| 7,668,754 B1 | 2/2010 | Bridgelall | |
| 7,853,255 B2 | 12/2010 | Karaoguz et al. | |
| 7,979,877 B2 | 7/2011 | Huber et al. | |
| 8,165,886 B1 | 4/2012 | Gagnon et al. | |
| 8,195,133 B2 | 6/2012 | Ramer et al. | |
| 8,249,925 B2 | 8/2012 | Broms et al. | |
| 8,370,197 B2 | 2/2013 | Axe et al. | |
| 8,386,386 B1 | 2/2013 | Zhu | |
| 8,666,807 B1 * | 3/2014 | Murray | G06Q 30/0241 705/14.4 |
| 8,849,694 B1 | 9/2014 | Chatterjee et al. | |
| 8,903,716 B2 | 12/2014 | Chen et al. | |
| 9,424,840 B1 | 8/2016 | Hart et al. | |
| 9,767,479 B2 * | 9/2017 | Filev | G06Q 30/02 |
| 10,013,978 B1 | 7/2018 | Bhaya et al. | |
| 10,089,647 B2 | 10/2018 | Juhasz | |
| 2002/0102988 A1 | 8/2002 | Myllymaki | |
| 2002/0116287 A1 | 8/2002 | Schubert et al. | |
| 2002/0116313 A1 | 8/2002 | Detering | |
| 2004/0044516 A1 | 3/2004 | Kennewick et al. | |
| 2004/0193488 A1 * | 9/2004 | Khoo | G06Q 30/02 705/14.52 |
| 2004/0203860 A1 | 10/2004 | Fellenstein et al. | |
| 2005/0267798 A1 * | 12/2005 | Panara | G06Q 30/02 705/14.61 |
| 2006/0224445 A1 | 10/2006 | Axe et al. | |
| 2007/0073723 A1 | 3/2007 | Ramer et al. | |
| 2007/0097975 A1 | 5/2007 | Rakers et al. | |
| 2007/0127688 A1 | 6/2007 | Doulton | |
| 2007/0197239 A1 | 8/2007 | Sane | |
| 2007/0281716 A1 | 12/2007 | Altman et al. | |
| 2008/0015863 A1 | 1/2008 | Agapi et al. | |
| 2008/0248815 A1 | 10/2008 | Busch | |
| 2008/0250453 A1 | 10/2008 | Smith et al. | |
| 2009/0030800 A1 | 1/2009 | Grois | |
| 2009/0070211 A1 | 3/2009 | Gonen | |
| 2009/0192929 A1 * | 7/2009 | Hoeflinger | G06Q 30/02 705/35 |
| 2009/0204410 A1 | 8/2009 | Mozer et al. | |
| 2009/0228270 A1 | 9/2009 | Odell et al. | |
| 2009/0292587 A1 | 11/2009 | Fitzgerald | |
| 2009/0326966 A1 | 12/2009 | Callaghan et al. | |
| 2010/0010890 A1 * | 1/2010 | Ditkovski | G06Q 30/02 705/14.41 |
| 2010/0023396 A1 | 1/2010 | Subramanian et al. | |
| 2010/0050098 A1 | 2/2010 | Turner | |
| 2010/0057639 A1 | 3/2010 | Schwarz et al. | |
| 2010/0088719 A1 | 4/2010 | Hawkins et al. | |
| 2010/0176985 A1 | 7/2010 | Sharma | |
| 2010/0211439 A1 | 8/2010 | Marci et al. | |
| 2010/0292991 A1 | 11/2010 | Lv | |
| 2011/0035379 A1 | 2/2011 | Chen et al. | |
| 2011/0067099 A1 | 3/2011 | Barton et al. | |
| 2011/0078014 A1 | 3/2011 | Feldman et al. | |
| 2011/0208596 A1 | 8/2011 | Kwon et al. | |
| 2011/0246286 A1 | 10/2011 | Cetin et al. | |
| 2012/0030034 A1 * | 2/2012 | Knapp | G06Q 30/02 705/14.71 |
| 2012/0041766 A1 | 2/2012 | Gong et al. | |
| 2012/0123856 A1 | 5/2012 | Paunikar et al. | |
| 2012/0130798 A1 | 5/2012 | Cooley et al. | |
| 2012/0180083 A1 * | 7/2012 | Marcus | G11B 27/034 725/32 |
| 2012/0203627 A1 | 8/2012 | Balseiro et al. | |
| 2012/0265528 A1 | 10/2012 | Gruber et al. | |
| 2013/0036202 A1 | 2/2013 | Lahav | |
| 2013/0063550 A1 | 3/2013 | Ritchey et al. | |
| 2013/0066725 A1 * | 3/2013 | Umeda | G06Q 30/0275 705/14.66 |
| 2013/0111487 A1 | 5/2013 | Cheyer et al. | |
| 2013/0117022 A1 | 5/2013 | Chen et al. | |
| 2013/0151332 A1 | 6/2013 | Yan et al. | |
| 2013/0275164 A1 | 10/2013 | Gruber et al. | |
| 2013/0304758 A1 | 11/2013 | Gruber et al. | |
| 2013/0317823 A1 | 11/2013 | Mengibar | |
| 2014/0067455 A1 | 3/2014 | Zhang et al. | |
| 2014/0222436 A1 | 8/2014 | Binder et al. | |
| 2014/0278981 A1 | 9/2014 | Mersov et al. | |
| 2015/0194167 A1 | 7/2015 | Jeong | |
| 2015/0302458 A1 | 10/2015 | Dides et al. | |
| 2015/0363748 A1 | 12/2015 | Beaurepaire et al. | |
| 2016/0042736 A1 | 2/2016 | Lee et al. | |
| 2016/0104200 A1 | 4/2016 | Osotio et al. | |
| 2016/0357519 A1 | 12/2016 | Vargas | |
| 2017/0034592 A1 * | 2/2017 | Ray | G06Q 30/0251 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |
| 2018/0052573 A1 | 2/2018 | Comertoglu et al. | |
| 2018/0190276 A1 | 7/2018 | Bhaya et al. | |
| 2018/0308484 A1 | 10/2018 | Bhaya et al. | |

FOREIGN PATENT DOCUMENTS

| | | | | |
|---|---|---|---|---|
| JP | 2011210238 A | * | 10/2011 | G06Q 50/00 |
| KR | 10-0481141 B1 | | 3/2005 | |
| KR | 10-2008-0072673 A | | 8/2008 | |
| KR | 10-2012-0110751 A | | 10/2012 | |
| KR | 10-2012-0137425 A | | 12/2012 | |
| KR | 1020120137425 A | | 12/2012 | |
| WO | WO-2007/064482 A1 | | 6/2007 | |

OTHER PUBLICATIONS

• Nahm, Un Yong. Text Mining with Information Extraction. (May 30, 2010). Retrieved online Mar. 25, 2020. http://neuro.bstu.by/ai/Data-mining/ut-ai-tr04-311.pdf (Year: 2010).*
• Finch, Dezon Kile. TagLine: Information Extraction for Semi-Structured Text Elements in Medical Progress Notes. (Oct. 25, 2012). Retrieved online Mar. 25, 2020. (Year: 2012).*
U.S. Appl. No. 13/532,209, filed Jun. 25, 2012.
"Going with CPT (cost per time) over CPM for Ads", Startup Nation Business Forum, http://www.startupnation.com/Going-with-CPT-cost-per-time-over-CPM-for-ads/topic/S, Dec. 4, 2010, 3 pgs. [Retrieved from website Jun. 11, 2013].
"Going with CPT (cost per time) over CPM for Ads", Startup Nation Business Forum, 3 pages.
"Walmart and Google to offer voice-enabled shopping", BBC News, Aug. 23, 2017.
Ad Traders, "Attention Economics Pricing in Advertising: Cost Per Second" Ad Exchanger, 5 pages.
Ad Traders, "Attention Economics Pricing in Advertising: Cost Per Second", Ad Exchanger, http://www.adexchanger.com/data-driven-thinking/attention-economics/, Oct. 19, 2010, [Retrieved from website Jun. 22, 2015].
Amazon, "Echo Look Hands-Free Camera and Style Assistant" reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Anita Wilhelm, Yuri Takhteyev, Risto Sarvas, Nancy Van House, and Marc Davis. 2004. Photo annotation on a camera phone. In CHI '04 Extended Abstracts on Human Factors in Computing Systems (CHI EA '04). ACM, New York, NY, USA, 1403-1406. DOI=http://dx.doi.org/10.1145/985921.986075.
Broussard, Mitchel, "Chatbot-Like Siri Patent Includes Intelligent Image, Video, and Audio Recognition Within Messages", MacRumors, May 11, 2017, 11 pages.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time.com (2 pages).
Clover, Juli, "Amazon and Google Want to Turn Their Smart Home Speakers Into Telephone Replacements", MacRumors, Feb. 15, 2017 (5 pages).

(56) References Cited

OTHER PUBLICATIONS

Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Donald J. Patterson, Xianghua Ding, Nicholas Noack. 2006. Nomatic: Location by, for, and of crowds. Proceedings of International Workshop on Location- and Context-Awareness LoCA 2006. 186-203. DOI=10.1007/11752967_13.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . .'", cnet, May 18, 2017 (7 pages).
Gibbs, Samuel, "Your Facebook Messenger app is about to be filled with ads", The Guardian, Jul. 12, 2017 (3 pages).
Giovanni Iachello, Ian Smith, Sunny Consolvo, Gregory D. Abowd, Jeff Hughes, James Howard, Fred Potter, James Scott, Timothy Sohn, Jeffrey Hightower, Anthony LaMarca. 2005. Control, Deception, and Communication: Evaluating the Deployment of a Location-Enhanced Messaging Service. In 7th International Conference, UbiComp 2005, Tokyo, Japan, Sep. 11-14, 2005. Proceedings, 213-231. DOI= 10.1007/11551201_13.
Giovanni Iachello, Ian Smith, Sunny Consolvo, Mike Chen, and Gregory D. Abowd. 2005. Developing privacy guidelines for social location disclosure applications and services. In Proceedings of the 2005 symposium on Usable privacy and security (SOUPS '05). ACM, New York, NY, USA, 65-76. DOI=http://dx.doi.org/10.1145/1073001.1073008.
Golgowski, Nina, "This Burger King Ad Is Trying to Control Your Google Home Device", Huffpost, Apr. 12, 2017 (7 pages).
Google Developers Newsletter "Google Assistant SDK", developers.google.com, 2 pages.
Gurma, Mark and Webb, Alex, "Apple is Manufacturing a Siri Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).
Ian Smith, Sunny Consolvo, Anthony Lamarca, Jeffrey Hightower, James Scott, Timothy Sohn, Jeff Hughes, Giovanni Iachello, Gregory D. Abowd. 2005. Social Disclosure of Place: From Location Technology to Communication Practices. Third International Conference, PERVASIVE 2005. 134-151. DOI= 10.1007/11428572_9.
Ian Smith. 2005. Social-Mobile Applications. Computer 38, 4 (Apr. 2005), 84-85. DOI=http://dx.doi.org/10.1109/MC.2005.140.
International Preliminary Report on Patentability for PCT/US2013/047593 dated Jan. 8, 2015.
International Preliminary Report on Patentability on PCT/US2014/036341 dated Dec. 15, 2015, 6 pgs.
International Search Report and Written Opinion in PCT Application No. PCT/US2014/036341 dated Sep. 2, 2014.
International Search Report and Written Opinion on PCT/US2013/047593 dated Nov. 4, 2013.
Juhong Liu, O. Wolfson and Huabei Yin. 2006. Extracting Semantic Location from Outdoor Positioning Systems. 7th International Conference on Mobile Data Management. doi: 10.1109/MDM.2006.87.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.

Larson, Selena, "Google Home now recognizes your individual voice", CNN Money, San Francisco, California, Apr. 20, 2017 (3 pages).
Lee, Dave, "The five big announcements from Google I/O", BBC, May 18, 2017, 11 pages.
Marc Davis, Michael Smith, Fred Stentiford, Adetokunbo, John Canny, Nathan Good, Simon King, Rajkumar Janakiraman. 2006. Using context and similarity for face and location identification. In Proceedings of the IS&T/SPIE 18th Annual Symposium on Electronic Imaging Science and Technology.
Marc Davis, Nancy Van House, Jeffrey Towle, Simon King, Shane Ahern, Carrie Burgener, Megan Finn, Vijay Viswanathan, Matthew Rothenberg. 2005. MMM2: Mobile Media Metadata for Media Sharing. In Extended Abstracts of the Conference on Human Factors in Computing Systems. ACM, New York, NY, USA, 1335-1338.
Marc Davis, Simon King, Nathan Good, and Risto Sarvas. 2004. From context to content: leveraging context to infer media metadata. In Proceedings of the 12th annual ACM international conference on Multimedia (MULTIMEDIA '04). ACM, New York, NY, USA, 188-195. DOI=http://dx.doi.org/10.1145/1027527.1027572.
Nieva, Richard, "Google Home and eBay can tell you how much that's worth", cnet, Mar. 8, 2017 (3 pages).
Patently Apple, "Apple Patent Reveals a New Security Feature Coming to Siri" Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Risto Sarvas, Erick Herrarte, Anita Wilhelm, and Marc Davis. 2004. Metadata creation system for mobile images. In Proceedings of the 2nd international conference on Mobile systems, applications, and services (MobiSys '04). ACM, New York, NY, USA, 36-48. DOI= http://dx.doi.org/10.1145/990064.990072.
Sablich, Justin, "Planning a Trip With the Help of Google Home", New York Times, dated May 31, 2017, 6 pages.
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys' Load Up Apps Legal Challenges at 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Spalding, Steve, "How to Cost User Engagement", How to Spilt an Atom—Ideas Reborn, 4 pages.
Spalding, Steve, "How to Cost User Engagement", How to Split an Atom—Ideas Reborn, http://howtosplitanatom.com/how-to-read-shorts/how-to-cost-user-engagement/, Sep. 20, 2007, [Retrieved from website Jun. 22, 2015].
Takashi Yoshino, Tomohiro Muta and Jun Munemori. 2002. NAMBA: location-aware collaboration system for shopping and meeting. IEEE Transactions on Consumer Electronics, vol. 48, No. 3. 470-477. doi: 10.1109/TCE.2002.1037030.

(56) References Cited

OTHER PUBLICATIONS

U.S. Notice of Allowance on U.S. Appl. No. 13/532,209 dated Jul. 10, 2017.
U.S. Notice of Allowance on U.S. Appl. No. 13/532,209 dated Mar. 31, 2017.
U.S. Notice of Allowance on U.S. Appl. No. 13/790,087 dated Jan. 6, 2016.
U.S. Office Action on U.S. Appl. No. 12/851,833 dated Aug. 8, 2012.
U.S. Office Action on U.S. Appl. No. 13/532,209 dated Nov. 4, 2013.
U.S. Office Action on U.S. Appl. No. 13/532,209 dated Jul. 3, 2013.
U.S. Office Action on U.S. Appl. No. 13/532,209 dated Mar. 4, 2014.
U.S. Office Action on U.S. Appl. No. 13/532,209 dated Oct. 28, 2016.
U.S. Office Action on U.S. Appl. No. 13/790,087 dated Jan. 26, 2017.
U.S. Office Action on U.S. Appl. No. 13/790,087 dated Jun. 9, 2016.
U.S. Office Action on U.S. Appl. No. 13/916,407 dated Jun. 19, 2015.
U.S. Office Action on U.S. Appl. No. 13/916,407 dated Nov. 17, 2015.
U.S. Office Action on U.S. Appl. No. 13/972,379 dated Jun. 24, 2015.
Willens, Max, "For publishers, Amazon Alexa holds promise but not much money (yet)", Digiday, Jul. 6, 2017, 5 pages.
Abrams, Help users find, interact & re-engage with your app on the Google Assistant, Google Developers Blog, Nov. 15, 2017 (16 pages).
Albrecht, "Alexa, How Can You Be Used in Restaurants?", the spoon, Dec. 10, 2017 (6 pages).
Barr, "AWS DeepLens—Get Hands-On Experience with Deep Learning With Our New Video Camera", AWS News Blog, Nov. 29, 2017 (11 pages).
Buckland et al., "Amazon's Alexa Takes Open-Source Route to Beat Google Into Cars", Bloomberg, Feb. 27, 2018 (6 pages).
Coberly, "Apple patent filing reveals potential whispering Siri functionality", Techspot, Dec. 14, 2017 (4 pages).
Communication pursuant to Article 94(3) EPC for Appl. Ser. No. EP 17772516.5 dated Mar. 27, 2019 (5 pages).
Estes, "Amazon's Newest Gadget is a Tablet That's Also an Echo", Gizmodo, Sep. 19, 2017 (3 pages).
Foghorn Labs, "10 Tips to Improve the Performance of Google Product Listing Ads," printed from Internet address: http://www.foghornlabs.com/2012/11/21/product-listing-ads-best-practices/, on Mar. 18, 2013 (5 pages).
Google Inc., "Products Feed Specification," printed from Internet address: http://www.support.google.com/merchants/bin/answer.py?hl=en&answer=188494#US, on Mar. 18, 2013 (6 pages).
Google Inc., "Supported File Formats," printed from Internet address: http://www.support.google.com/merchants/bin/answer.py?hl=en&answer=160567, on Mar. 18, 2013 (1 page).
Heater, "Amazon Alexa devices can finally tell voices apart", TechCrunch, Oct. 11, 2017 (6 pages).
International Search Report and Written Opinion for Appl. Ser. No. PCT/US2017/049709 dated Dec. 5, 2017 (12 pages).
Johnston, "Amazon Whirlwind: New Echo, Plus, Spot, Connect, Fire TV Take The Stage", Twice, Sep. 27, 2017 (4 pages).
JP Office Action for Appl. Ser. No. 2017-556903 dated Feb. 25, 2019 (3 pages).
Kelion, "Amazon revamps Echo smart speaker family", BBC News, Sep. 27, 2017 (11 pages).
KR Office Action for Appl. Ser. No. 10-2017-7031607 dated Jan. 24, 2019 (10 pages).
Krishna, "Jim Beam's smart decanter will pour you a shot when you ask", engadget, Nov. 29, 2017 (3 pages).
Lacy, "Improving search and advertising are the next frontiers for voice-activated devices", TechCrunch, Dec. 20, 2017 (13 pages).
Lee, Take Two for Samsung's troubled Bixby assistant, BBC News, Oct. 19, 2017 (6 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013 (17 pages).
Novet, et al., "Amazon is getting ready to bring Alexa to work", CNBC, Nov. 29, 2017 (4 pages).
Palladino, "Garmin teamed up with Amazon to make a tiny Echo Dot for your car", ars Technica, Oct. 17, 2017 (2 pages).
Perez, "Alexa's 'Routines' will combine smart home control with other actions, like delivering your news and weather", TechCrunch, Sep. 28, 2017 (10 pages).
Pringle, "'I'm sorry to hear that': Why training Siri to be a therapist won't be easy", CBC News, Sep. 24, 2017 (3 pages).
Unknown Author, "'Dolphin' attacks fool Amazon, Google voice assistants", BBC News, Sep. 7, 2017 (8 pages).
U.S. Notice of Allowance for U.S. Appl. No. 15/395,682 dated Feb. 26, 2018 (9 pages).
U.S. Office Action for U.S. Appl. No. 15/091,323 dated Feb. 25, 2019 (18 pages).
U.S. Office Action for U.S. Appl. No. 15/498,237 dated Feb. 8, 2019 (11 pages).
U.S. Office Action for U.S. Appl. No. 15/584,839 dated Feb. 25, 2019 (17 pages).
U.S. Office Action for U.S. Appl. No. 15/596,943 dated Apr. 9, 2019 (21 pages).
U.S. Office Action for U.S. Appl. No. 15/596,943 dated Dec. 19, 2018 (28 pages).
Decision to Grant a Patent for JP 2017-556903 dated Oct. 7, 2019 (5 pages).
Examination Report for AU Appl. Ser. No. 2017386093 dated Nov. 29, 2019 (2 pages).
Notice of Allowance for U.S. Appl. No. 15/498,237 dated Nov. 29, 2019 (6 pages)
Non-Final Office Action for U.S. Appl. No. 15/596,943 dated Dec. 10, 2019 (23 pages).
Examination Report for IN Appln. Ser. No. 201747039586 dated Jan. 24, 2020 (6 pages).
Final Office Action for U.S. Appl. No. 16/018,854 dated Mar. 9, 2020 (27 pages).
Decision of Rejection for KR 10-2017-7031607 dated Jul. 26, 2019 (7 pages).
Final Office Action for U.S. Appl. No. 13/790,121 dated Dec. 17, 2014 (5 pages).
Non-Final Office Action for U.S. Appl. No. 13/790,121 dated Aug. 13, 2014 (6 pages).
Non-Final Office Action for U.S. Appl. No. 15/584,839 dated Sep. 6, 2019 (17 pages).
Non-Final Office Action for U.S. Appl. No. 16/018,854 dated Oct. 4, 2019 (23 pages).
Notice of Allowance for U.S. Appl. No. 13/790,121 dated Aug. 27, 2015 (8 pages).
Notice of Allowance for U.S. Appl. No. 13/790,121 dated Jun. 9, 2014 (8 pages).
Notice of Allowance for U.S. Appl. No. 15/498,237 dated Aug. 12, 2019 (8 pages).
Reason for Refusal for KR 10-2017-7031607 dated Sep. 16, 2019 (7 pages).
Final Office Action for U.S. Appl. No. 15/596,943 dated Mar. 30, 2020 (22 pages).
Non-Final Office Action for U.S. Appl. No. 15/584,839 dated May 1, 2020 (17 pages).
Notice of Allowance for U.S. Appl. No. 15/596,943 dated Jun. 5, 2020 (10 pages).
Peterson, et al., "Location-Based Advertising: the Key to Unlocking the Most Value in the Mobile Advertising and Location-Based Services Markets", Peterson Mobility Solutions, Dec. 2009, available at URL: https://www.mmaglobal.com/files/PetersonMobility_20100217144146.pdf, pp. 1-39 (39 pages).

\* cited by examiner

CONTENT EXPOSURE INTERVAL BASED CONTENT ITEM DEPLOYMENT

CROSS-REFERENCES TO RELATED APPLICATIONS

This application claims the benefit and priority under 35 U.S.C. § 120 as a continuation of U.S. patent application Ser. No. 13/532,209, titled "SYSTEMS AND METHODS FOR DEPLOYING ADS BASED ON A CONTENT EXPOSURE INTERVAL", filed Jun. 25, 2012, which is hereby incorporated by reference in its entirety.

BACKGROUND

The present disclosure relates to content presentation.

Advertisers provide content such as advertisements in different forms in order to attract consumers. An advertisement ("ad") is a piece of information designed to be used in whole or part by a user, for example, a particular consumer. Ads can be provided in electronic form. For example, online ads can be provided as banner ads on a web page, as ads presented with search results, or as ads presented in a mobile application.

One can refer to the inclusion of an ad in a medium, e.g., a webpage or a mobile application, as an impression. An advertising system can include an ad in a webpage, for example, in response to one or more keywords in a user search query input to a search engine. If a user selects the presented ad (e.g., by "clicking" the ad), the user is generally taken to another location associated with the ad, for example, to another, particular web page.

Content such as advertisements can be allocated through an auction process. For example, advertisers can provide bids specifying amounts that the advertisers are respectively willing to pay for presentation of their advertisements. In turn, an auction can be performed and advertisement slots (e.g., locations on a web page or within a mobile application) can be allocated to advertisers according to their bids. When one advertisement slot is being allocated in the auction, the advertisement slot can be allocated to the advertiser that provided the highest bid or a highest auction score (e.g., a score that is computed as a function of a bid and/or an advertisement quality measure). When multiple advertisement slots are allocated in a single auction, the advertisement slots can be allocated to a set of bidders that provided the highest bids or have the highest auction scores.

It is with respect to these and other considerations that the disclosure made herein is presented.

SUMMARY OF THE INVENTION

This specification describes technologies relating to content presentation.

In general, one aspect of the subject matter described in this specification can be embodied in methods for deploying ads. The method includes the actions of computing an exposure interval of a content segment, identifying at least two advertisements that are candidates to be provided within an advertising slot of the content segment, wherein a first of the at least two advertisements is associated with a cost per time unit (CPT) bid and a second of the at least two advertisements is associated with a non-CPT bid, determining, using an amount of the CPT bid, an amount of the non-CPT bid, and the exposure interval, whether a first amount of expected revenue from providing the first of the at least two advertisements in the advertising slot is greater than a second amount of expected revenue from providing the second of the at least two advertisements in the advertising slot, and, in response to determining that the first amount of expected revenue is greater than the second amount of expected revenue, providing the first of the at least two advertisements in the advertising slot.

In general, another aspect of the subject matter described in this specification can be embodied in methods for setting a bid type. The method includes the actions of processing, with a processor executing code, at least one advertisement to compute a target exposure interval, determining a bid type for association with the at least one advertisement based on the target exposure interval, and, responsive to a selection of the advertisement in an auction on the basis of the bid type, providing the at least one advertisement within a webpage.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

By way of overview and introduction, ads associated with various bid types can be deployed across content segments (such as webpages or portions thereof) in a manner that improves or optimizes the revenue such ads (and their associated bids) generate for the content publishers on whose webpages the ads are presented. Among such bid types are bids which are monetized as a function of the time (e.g., per second, per minute, etc.) that the associated ads are exposed to/viewable by website viewers/users.

Determinations of the ad (or ads) to deploy within a particular content segment or segments can be computed with reference to the associated bid type(s) and an exposure interval of the content segment (reflecting the amount of time the content segment is expected to be exposed to/viewable by a user). In certain implementations, the exposure interval can be further computed or refined with respect to a particular group or demographic. In processing an exposure interval with the bids associated with various ads, a determination of which ad is expected to generate a greatest amount of revenue within a particular content segment can be identified.

While reference will be made below to advertising systems and processes, other forms of content including other forms of sponsored content can be managed and presented in accordance with the description below.

Figure 1:
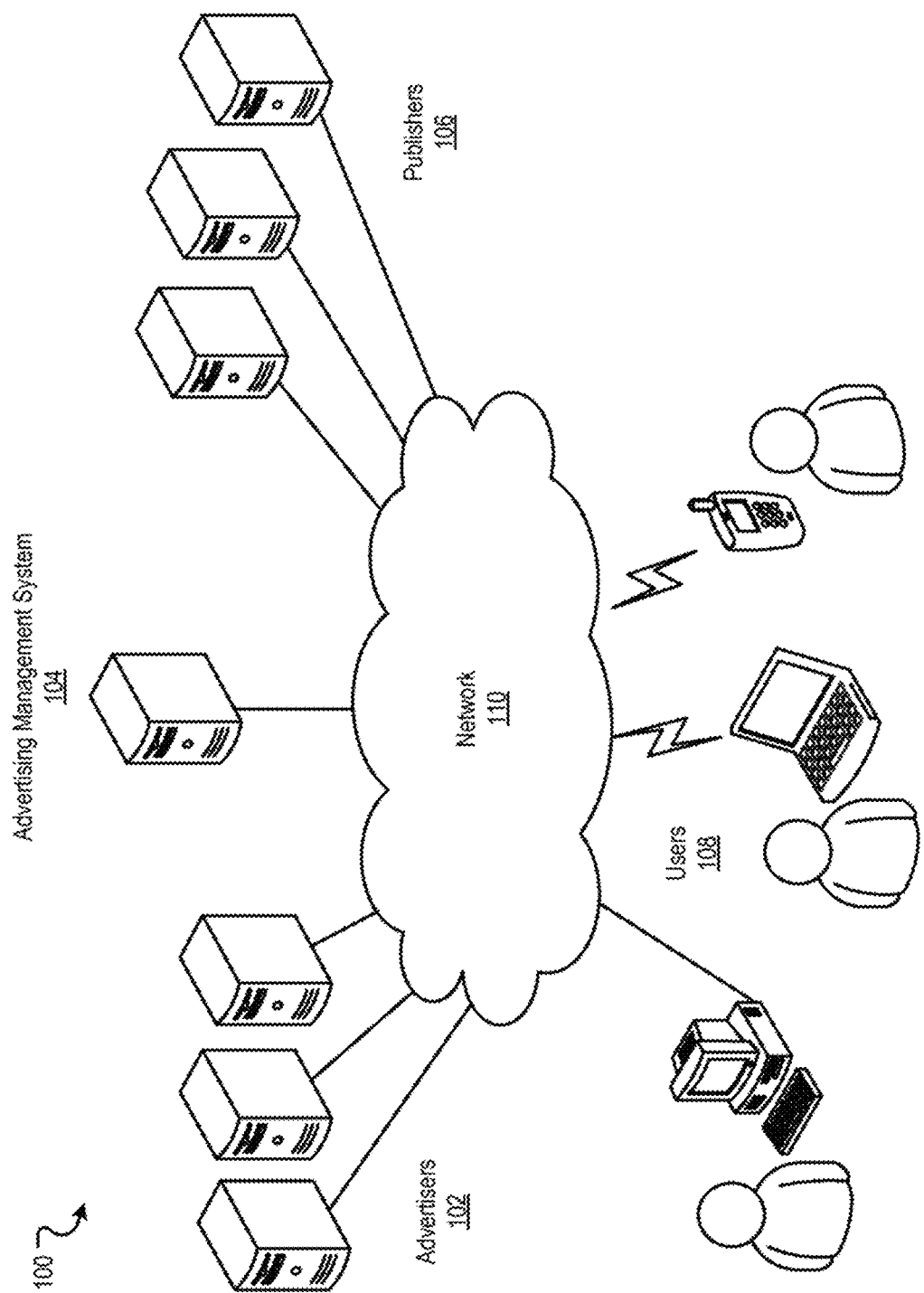
FIG. 1 is a diagram of an example content presentation system.

FIG. 1 is a block diagram showing an example content presentation system 100. In some implementations, one or more advertisers 102 can directly, or indirectly, enter, maintain, and log ad information in an advertising management system 104. Though reference is made to advertising, other forms of content, including other forms of sponsored content, can be delivered by the system 100. The ads can be in the form of graphical ads, such as banner ads, text-only ads, image ads, audio ads, video ads, ads combining one or more of any of such components, etc. The ads can also include embedded information, such as links, meta-information, and/or machine executable instructions.

One or more publishers 106 can submit requests for ads to the system 104. The system 104 responds by sending ads to the requesting publisher 106 for placement on, or association with, one or more of the publisher's content items (e.g., web properties). Example web properties can include web pages, television and radio advertising slots, or print media space.

Other entities, such as users 108 and the advertisers 102, can provide usage information to the system 104, such as, for example, whether or not a conversion (e.g., a purchase or other interaction including, for example, a request for driving directions to a location associated with an ad, navigating to the location associated with the ad, or walking to the location associated with the ad) or a click-through related to an ad (e.g., a user has selected an ad) has occurred. This usage information can include measured or observed user behavior related to ads that have been served. In some cases, a user may opt in or opt out of allowing user behavior to be recorded, measured, or observed. In some cases, identifiers associated with each user may be anonymized so that the identity of each user is not provided to the advertiser. The system 104 can perform financial transactions, for example, crediting the publishers 106 and charging the advertisers 102 based on the usage information.

A network 110, such as a local area network (LAN), wide area network (WAN), the Internet, one or more telephony networks or a combination thereof, connects the advertisers 102, the system 104, the publishers 106, and the users 108.

One example publisher 106 is a general content server that receives requests for content (e.g., articles, discussion threads, music, video, graphics, search results, web page listings, information feeds, etc.), and retrieves the requested content in response to the request. The content server can submit a request for content such as ads to a content server such as an advertisement server in the system 104. The ad request can include a number of ads desired. The ad request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser can combine the requested content with one or more of the ads provided by the system 104. The combined content and ads can be sent/rendered to the users 108 that requested the content for presentation in a viewer (e.g., a browser or other content display system). The content server can transmit information about the ads back to the content server, including information describing how, when, and/or where the ads are to be rendered (e.g., in HTML or JavaScript™)

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a predetermined number of (e.g., ten) search results.

The search service can submit a request for ads to the system 104. The request can include a number of ads desired. This number can depend on the search results, the amount of screen or page space occupied by the search results, the size and shape of the ads, and/or a variety of other factors. In some implementations, the number of desired ads will be from one to ten, or from three to five. The request for ads can also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

In some implementations, the content management system 104 includes an auction process to select ads from the advertisers 102. For example, the advertisers 102 can be permitted to select, or bid, an amount the advertisers are willing to pay for each presentation of or interaction with (e.g., click of) an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The search service can combine the search results with one or more of the ads provided by the system 104. This combined information can then be forwarded to the users 108 that requested the content. The search results can be maintained as distinct from the ads, so as not to confuse the user between paid ads and presumably neutral search results.

In some implementations, one or more publishers 106 can submit requests for ads to the advertising management system 104. The system 104 responds by sending ads to the requesting publisher 106 for placement on one or more of the publisher's web properties (e.g., websites and other network-distributed content) that are relevant to the web property. For example, if a publisher 106 publishes a sports-related web site, the advertising management system can provide sports-related ads to the publisher 106. In some implementations, the requests can instead be executed by devices associated with the user 108, e.g., by the execution of a particular script when the publisher's web page is loading on a client device.

In some alternative implementations, an ad push model is used to provide ads from advertisers 102. In an ad push model, ads can be pushed to idle screens (e.g., of a mobile devices or particular applications) based on particular criteria (e.g., the user's location).

In another example publisher 106 is a mobile application developer. A mobile application is an application specifically designed for operation on a mobile device (e.g., a smart phone). The mobile application can also include ads positioned within the content of the mobile application. Similar to publishers 106, the ads can be received from the system 104 for placement in the mobile application when accessed by a user (e.g., when a particular page of a mobile application is loaded on the mobile device).

Figure 2:
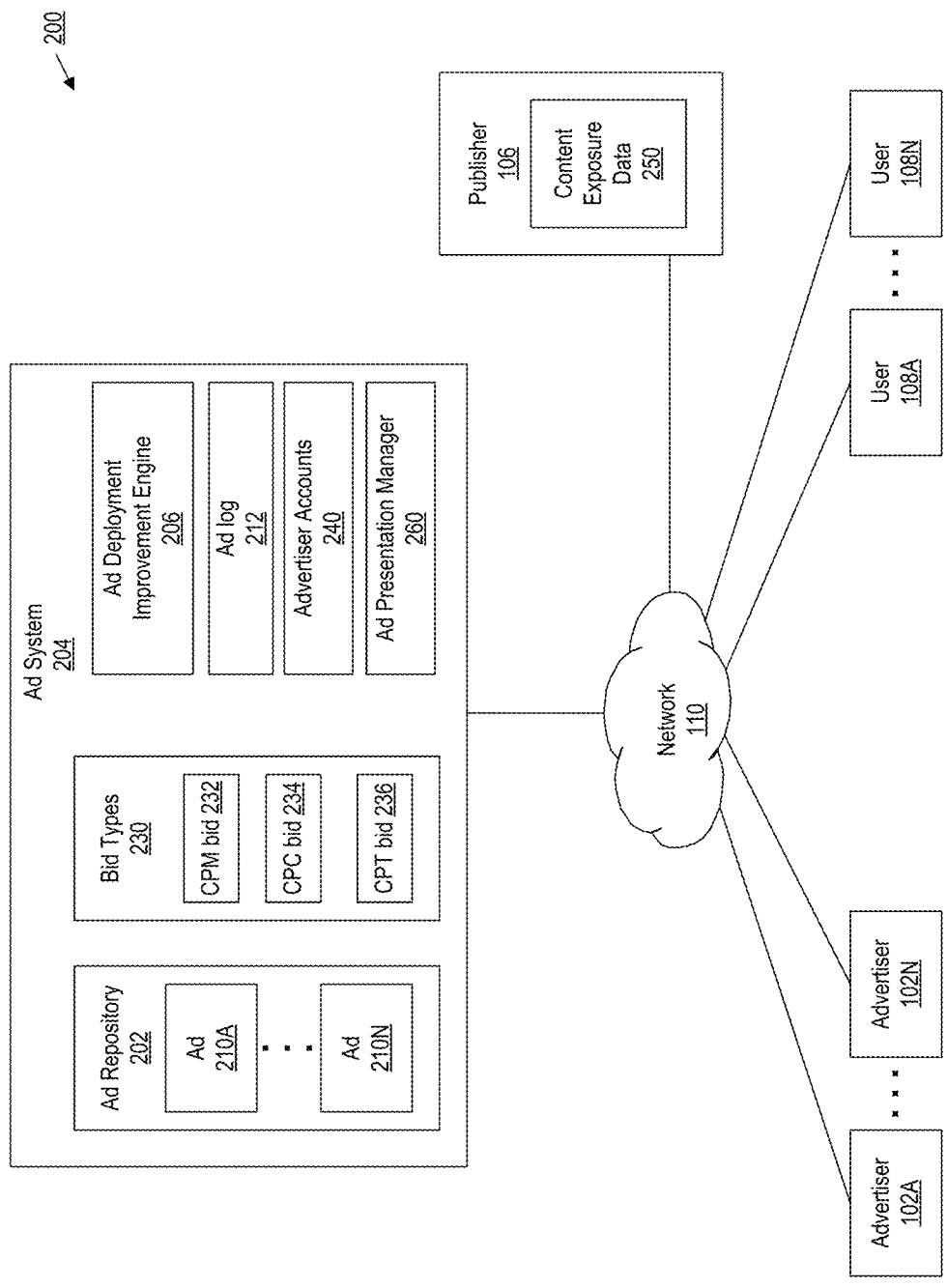
FIG. 2 is a block diagram of an example system for improved ad deployment.

FIG. 2 is a block diagram of an example system 200 for improved ad deployment. In the system 200, an advertiser 102A-102N (referred to collectively as advertisers 102) can submit one or more ads 210A-210N (also known as "creatives") (referred to collectively as ads 210) to an ad system 204, and such ads 210 are stored in an ad repository 202. Each (e.g., ad 210A) includes one or more words, phrases, web links, and/or any other such element and/or component (e.g., images, video, audio, etc.) that are provided to one or more users 108 (e.g., banner ads, text-only ads, image ads, audio ads, video ads, etc.). In certain implementations, one or more keywords (not shown) are associated with one or more creatives in order to enable the identification and selection of pertinent ads for display to a user based on one or more search queries received from the user. It should also be noted that although ads 210 are described herein as referring to individual ads, in certain implementations ads 210 can refer to groups of ads, such as ad groups, campaigns, and/or categories.

Ad system 204 can also include an ad presentation manager 260. The ad presentation manager 260 can identify ads in the ad repository 202 to present to a user 108, for example based on various criteria such as keywords in a search query, web page content, context, location, ad financials (e.g., cost per impression). For example, ad presentation manager 260 can identify one or more ads 210 associated with one or more keywords that are similar and/or identical to the search query provided by the user, and such creatives can be provided to the user in any number of ad formats. It should be understood that in some implementations, the ad system 204 can interact with a search system, for example presenting ads alongside search results. In some implementations, the ad system 204 can interact with content publishers, for example, providing ads to publishers or users for presentation along with web content, e-mail, or other content.

Ad system 204 can also include one or more ad logs 212. Ad log 212 can track and store one or more performance metrics that reflect the performance or success of a particular ad. For example, for a given ad, ad log 212 can track the 'click through rate,' reflecting the percentage of users presented with a creative that click on or otherwise select the presented content, though it should be understood that any number of other performance metrics can be similarly tracked (e.g., conversion rate), as is known to those of ordinary skill in the art.

Additionally, ad system 204 can include an ad deployment improvement engine 206. The ad deployment improvement engine 206 can process a content segment such as a webpage, in order to determine one or more ads to be deployed within the content segment. It should be understood that ad deployment improvement engine 206 can process any number of elements and/or components of various ads, content segments, publishers, advertisers, users, and/or bid types, in order to compute and/or generate such determinations. It should also be understood that in some implementations ad deployment improvement engine 206 can include one or more processors configured by code to implement the functionality of the ad deployment improvement engine that is being described.

Ad system 204 can also include one or more bid types 230. In certain implementations, a particular bid type can reflect one or more ways or methods in which an advertiser 102 can elect to provide to an advertising auction, and subsequently to pay for the serving of a particular ad 210 by ad system 204. Examples of such bid types 230 include: cost per impression (referred to herein as "CPM") bid 232, whereby an advertiser bids a specified amount for an instance of display/serving of an ad to a user 108 (irrespective of the length of time that the ad is viewable and/or any subsequent interaction with the ad), cost per click (referred to herein as "CPC") bid 234, whereby an advertiser bids a specified amount for an instance of user interaction with the ad, such as a click by the user on the ad, and/or cost per time unit (referred to herein as "CPT") bid 236, whereby an advertiser bids a specified amount per time unit (such as seconds, minutes, etc.) that an ad is displayed to and/or viewable by a user. It should be understood that bid types 232-236 are merely exemplary, and that other ad bid types can be similarly employed, such as bids based on conversion rates, as are known to those or ordinary skill in the art. Additionally, it should be understood that in some implementations, bid types 230 can be associated with one or more ads 210. For example, ad 210A can be associated with a particular CPM bid 232 (e.g., a bid to pay up to $0.02 per impression) while ad 210N can be associated with a particular CPT bid 236 (e.g., a bid to pay up to $0.005 per second). Moreover, it should be noted that bids such as CPM bids and CPC bids can be characterized as being non-CPT bids, on account of the fact that their respective bids are not implemented as a function of time.

Ad system 204 can also include one or more advertiser accounts 240. Each individual advertiser account (not shown) corresponds to advertising funds associated with a particular advertiser 102. Funds are deducted from such accounts upon the successful serving of one or more ads on behalf of a particular advertiser, such as in the manner described in detail herein.

As described above, one or more publishers 106 can be in communication with ad system 204 through network 110. In certain implementations, publishers 106 can maintain content exposure data 250 with respect to the content (e.g., one or more websites, webpages, blogs, media files, etc.) provided by the publisher, thought it should be understood that in other implementations such content exposure data 250 can be similarly maintained by another entity, such as ad system 204. Examples of content exposure data 250 include one or more metrics that reflect the time and/or degree that users 108 engage with the content provided by publishers 106, such as particular areas, regions, and/or pages of a particular website.

Figure 3A:
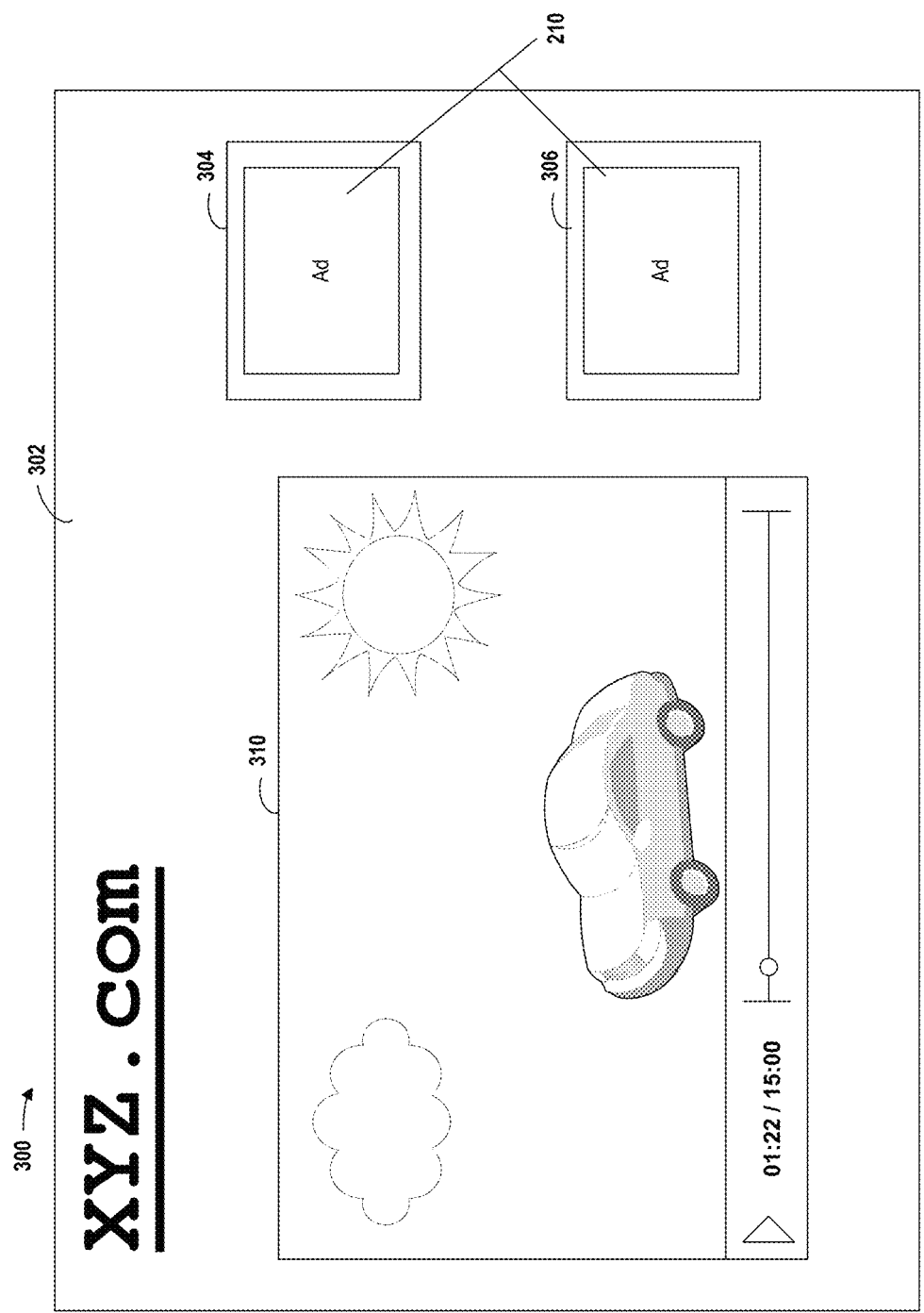
FIG. 3A is an exemplary screenshot reflecting an exemplary webpage.

Turning now to FIG. 3A, an exemplary screenshot 300 is provided, reflecting an exemplary webpage 302 provided by publisher 106 to user 108. As can be appreciated with reference to FIG. 3A, the webpage 302 includes an embedded video 310 with a duration of 15 minutes, and two ad slots 304 and 306. Ad slots refer to areas within a webpage that are designated or reserved for the display of ads. It can be appreciated that ads 210 are deployed in the respective ad slots 304, 306.

Figure 3B:
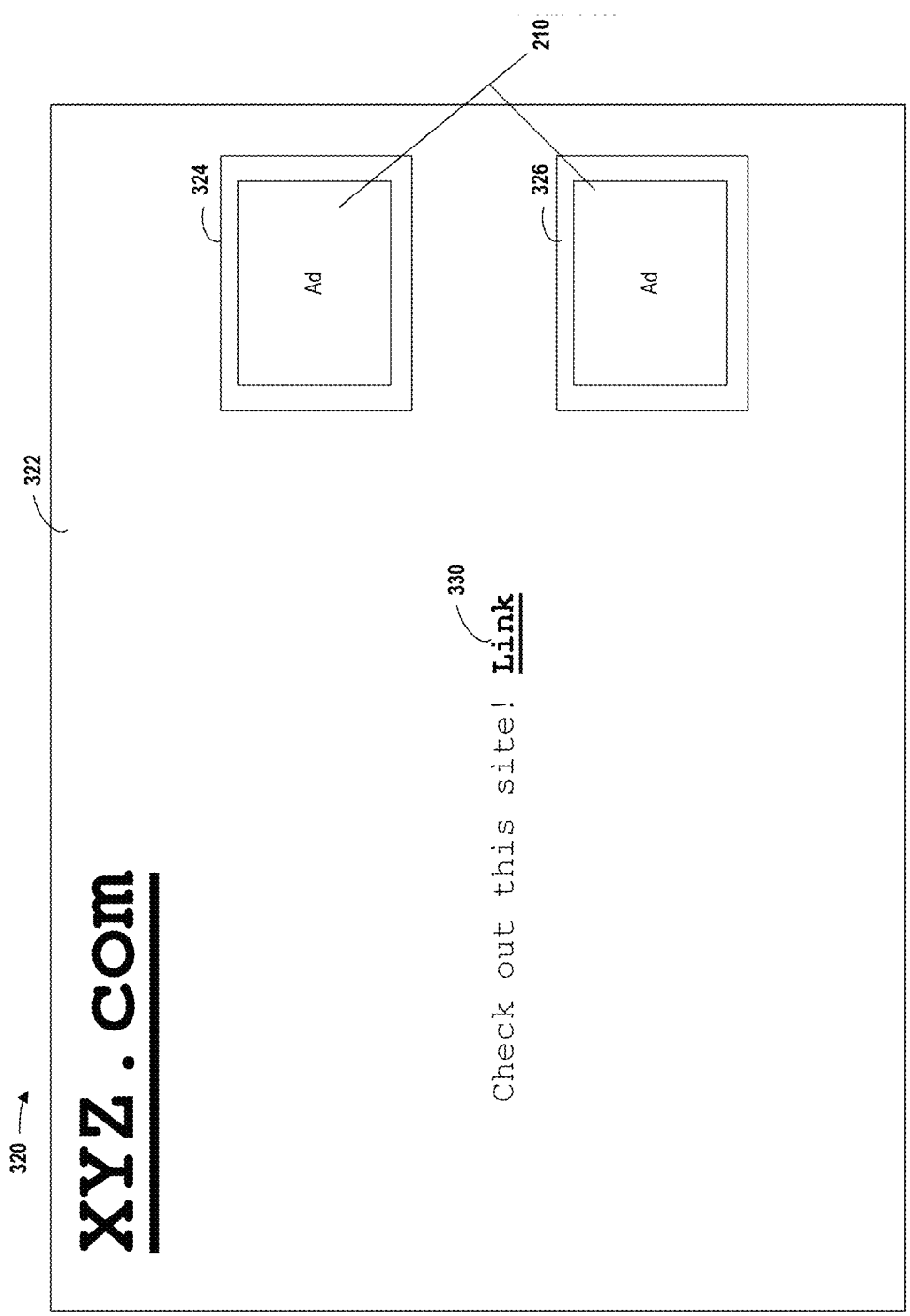
FIG. 3B is an exemplary screenshot reflecting another exemplary webpage.

FIG. 3B depicts an exemplary screenshot 320 of another exemplary webpage 322. This webpage provides a brief reference to a hyperlink 330 to another webpage, as well as two ad slots 324 and 326 within which ads 210 are respectively deployed. It can be appreciated that users 108, on average, are likely to spend relatively less time viewing the webpage shown in FIG. 3B (consisting primarily of a hyperlink to another site) than the webpage shown in FIG. 3A (consisting primarily of a 15 minute embedded video), and the results of this discrepancy can be reflected in the content exposure data 250 maintained for each respective page. It can be further appreciated that deploying ads associated with various bid types across the different webpages can serve to improve and/or optimize the advertising revenue generated by each webpage, as described in greater detail herein.

Figure 3C:
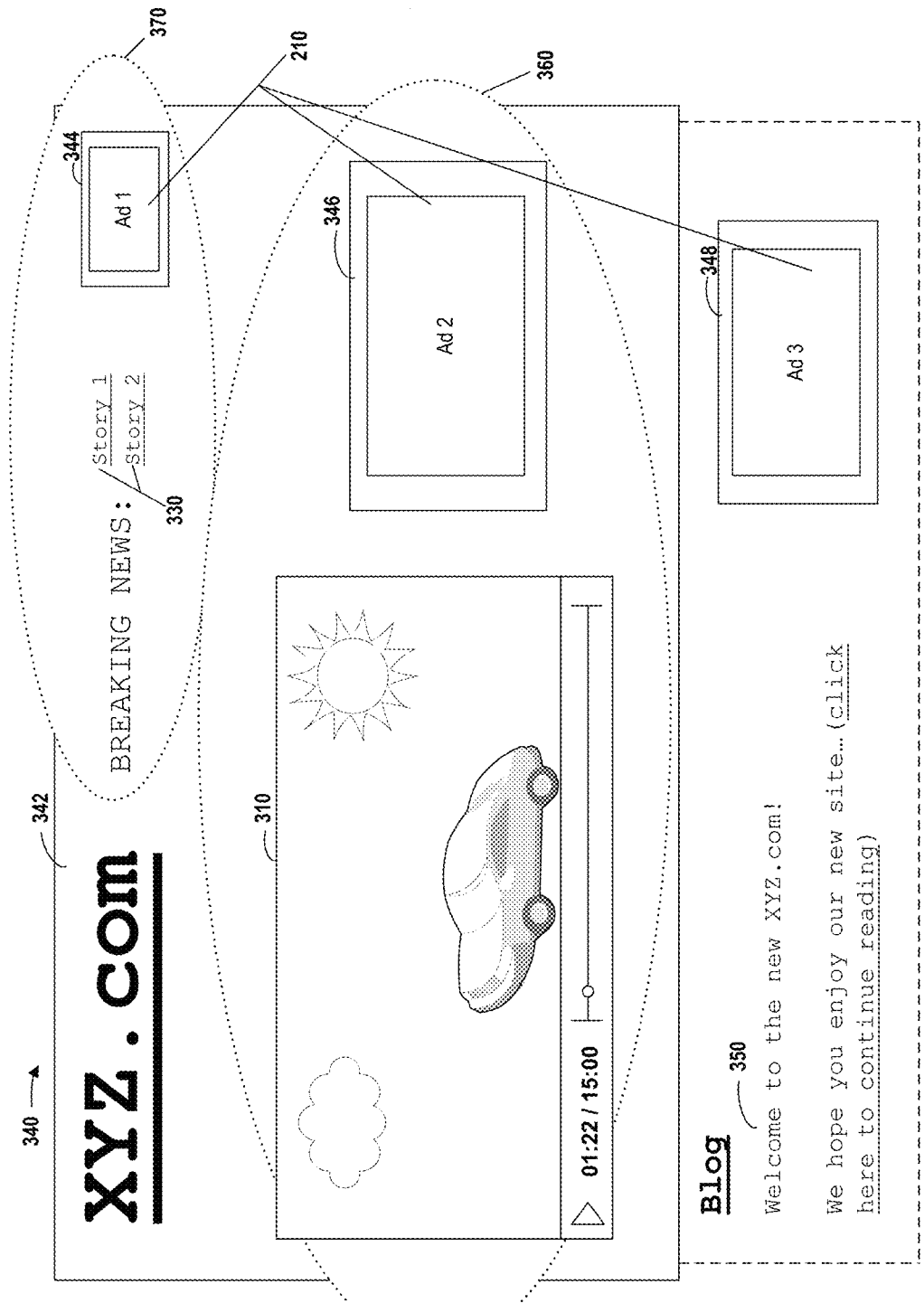
FIG. 3C is an exemplary screenshot reflecting yet another exemplary webpage.

FIG. 3C depicts an exemplary screenshot 340 of yet another exemplary webpage 342. It can be appreciated that only a portion of the webpage is viewable at any given time, as the content of the page extends beyond the area that the screen is capable of displaying. Accordingly, it can be appreciated that while content such as hyperlinks 330, embedded video 310, and ads 1-2 are viewable, other content such as blog 350 and ad 3 are not viewable without scrolling the page down. Moreover, as referenced above, it can be appreciated that certain content segments (e.g., embedded video 310) are likely to attract longer periods of user engagement than other content segments (e.g., hyperlinks 330). As such, deploying ads associated with different bid types in proximity to the respective content segments can serve to improve and/or optimize the advertising revenue generated by the page as a whole, as described in greater detail herein.

Figures 4A, 4B:
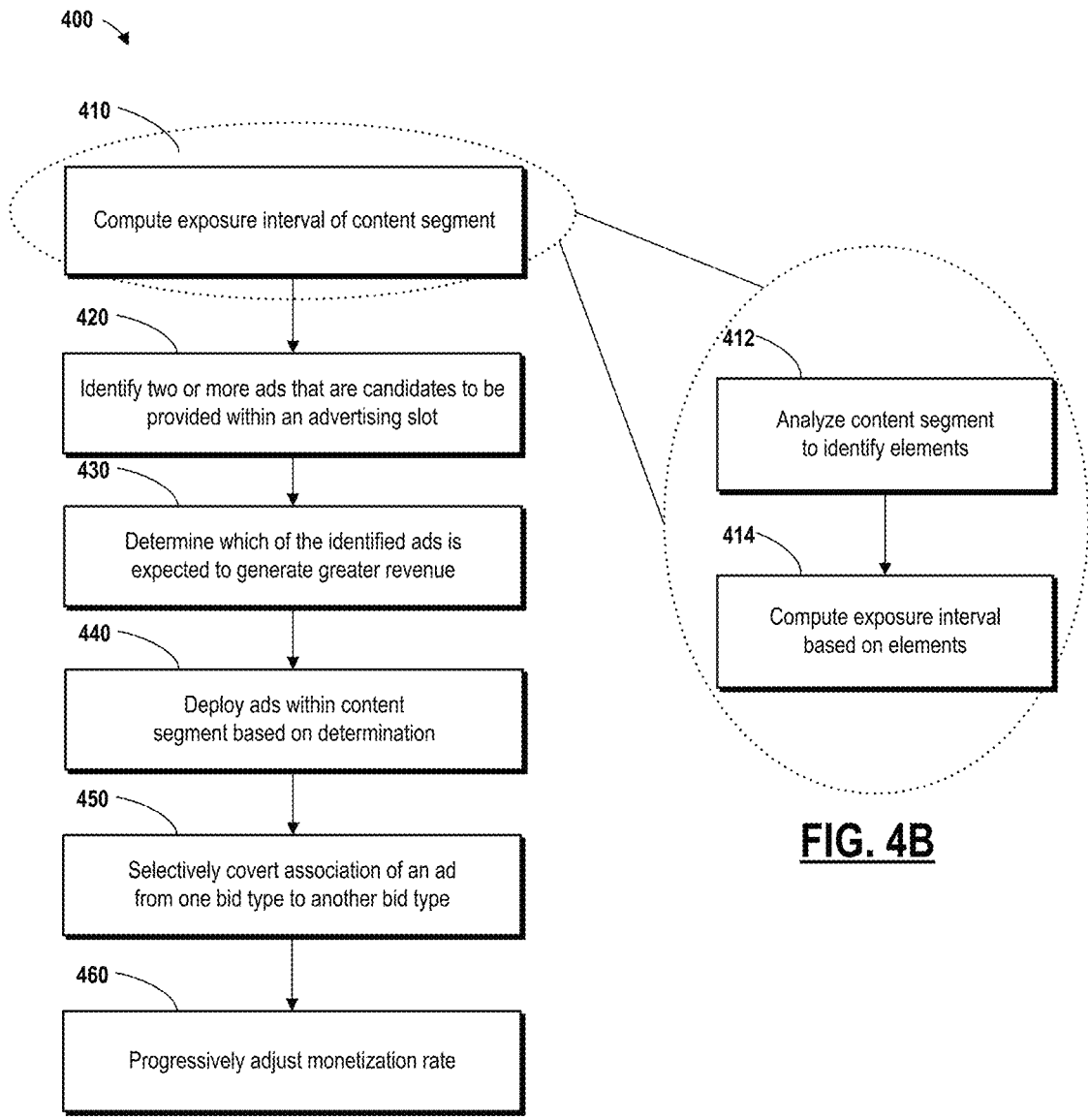
FIG. 4A is a flow chart of an example process for deploying ads.
FIG. 4B is a flow chart showing further aspects of an example process for computing an exposure interval of a content segment.

FIG. 4A is a flowchart of an example method 400 for deploying ads. In some implementations, the method 400 can be performed by a processor executing instructions in a computer-readable storage medium. For example, the method 400 can be performed by the ad system 204 of FIG. 2.

An exposure interval of a content segment is computed (410). It should be understood that in certain implementations, such a content segment can be a webpage (e.g., the webpage 302 as depicted in FIG. 3A), while in other implementations the content segment can be a portion of a webpage (e.g., segment 360 in FIG. 3C, reflecting the portion of webpage 342 containing media/video content 310). By way of example, an exposure interval can be measured as a function of time, such as 15 seconds, five minutes, etc.

In order to compute an exposure interval of a content segment, in certain implementations, previous exposure instances (as contained/reflected, for example, in content exposure data 250) can be analyzed to determine an average exposure interval. Such previous exposure instances (corresponding to data such as 'time on page,' 'bounce rate,' and other such web traffic metrics that reflect aspects, such as duration, of a user engagement with a particular content segment such as a webpage and/or website, as are known to those of ordinary skill in the art), can be processed in order to compute an average exposure interval. It can thus be appreciated that the average exposure interval reflects an amount of time that users, on average, engage with and/or otherwise view a particular content segment (e.g., 15 seconds, five minutes, etc.).

At this juncture, it should be noted that in certain implementations, the referenced exposure interval/average exposure interval can be computed/refined with respect to one or more user profiles or user types. That is, it can be appreciated that users among a first demographic (e.g., between the ages of 18-25) can relate to various content segments differently than users among a second demographic (e.g., between the ages of 55-65). For example, users between the ages of 18-25 can, on average, spend more time engaging with video/media content as compared to text content, while users between the ages of 55-65 can, on average, spend more time engaging with text content as compared to video/media content. As such, it can be appreciated that a particular content segment (e.g., a content segment containing an embedded video) can have different exposure intervals/average exposure intervals for different user profiles/demographics. It should also be noted that in certain implementations, a user profile/demographic can be provided by a user (such as through user profile information composed/provided by the user), while in other implementations such a user profile/demographic can be generated based on user behavior that has been observed (though it should be understood that in some cases a user may opt in or opt out of such an observation, and in some cases, identifiers associated with each user may be anonymized, as referenced above).

Turning briefly to FIG. 4B, further aspects of the computing of an exposure interval of a content segment are shown. In certain implementations a content segment can be analyzed to identify one or more elements of the content segment (412). Examples of such elements include media content (such as an embedded video or audio file or stream), text content (such as a blog post or article), a hyperlink, and/or aspects of such elements. By way of illustration, the HTML code corresponding to/underlying a particular webpage (e.g., webpage 302 depicted in FIG. 3A) and/or a portion of a webpage (e.g., segment 360 in FIG. 3C) can be analyzed to identify elements (such as media/video content 310) within the webpage/portion thereof. Accordingly, it can be appreciated that in certain implementations, an exposure interval can be computed based on the one or more elements (414). That is, having identified media/video content 310 within a content segment (a webpage/portion of a webpage), an exposure interval can be computed on account of the presence of the media/video content 310 (content which generally increases an exposure interval of a content segment). It certain implementations, different elements of a content segment can be associated with fixed exposure intervals (e.g., media/video content is ascribed a five minute exposure interval, blog posts/articles are ascribed a two minute exposure interval, hyperlinks are ascribed a five second exposure interval, etc.), while in other implementations certain aspects of such elements can dictate/suggest a particular exposure interval to be ascribed to the pertinent content segment. For example, the finite duration of media/video content (e.g., 15 minutes, as shown in FIG. 3A), and or some function thereof (e.g., 50% of the total duration of the media/video content) can dictate/suggest the referenced exposure interval. By way of further example, the number of words in a blog post or article (e.g., blog 350 in FIG. 3C) can dictate/suggest the referenced exposure interval (e.g., each 50 words of a blog post/article is equivalent to one minute of an exposure interval). It can be appreciated that by computing an exposure interval based on elements of a content segment, a determination can be made regarding the exposure interval of the content segment, even in scenarios where there are no previous exposure instances (such as those referenced at 410) or in scenarios where such previous exposure instances are not statistically significant. Accordingly, such exposure intervals, such as those computed based on the various elements within a content segment, can be said to be projected exposure intervals, as they reflect a projected exposure interval that can be computed even in scenarios where little or no historical data exists and/or is available.

Returning to FIG. 4A, two or more advertisements that are candidates to be provided within an advertising slot of the content segment can be identified (420). In certain implementations, one of the advertisements can be associated with a CPT bid and another of the advertisements can be associated with a non-CPT bid. For example, ad 210A can be associated with a particular CPM bid 232 (e.g., a bid to pay up to $0.02 per impression) while ad 210N can be associated with a particular CPT bid 236 (e.g., a bid to pay up to $0,005 per second).

A determination is made regarding whether the amount of revenue expected from providing one of the identified advertisements in an advertising slot is greater than the amount of revenue expected from providing another of the identified advertisements in the advertising slot (430). In certain implementations, such a determination is achieved using an amount of the CPT bid (e.g., the CPT bid referenced at 420), an amount of the non-CPT bid (e.g., the non-CPT bid referenced at 420), and the exposure interval (such as the exposure interval computed at 410). That is, as referenced herein, advertisers 102 can participate in an auction whereby the advertisers can bid various monetary amounts, with the highest/winning bid (optionally in combination with the relevance of the particular ad, as referenced above) entitling the advertiser to serve their ad to a user. For example, an auction process can yield a CPM bid of up to $0.05 per impression, a CPC bid of up to $0.15 for per click, and/or a CPT bid for up to $0.01/second. Each respective bid in the auction can be processed with an exposure interval (such as the exposure interval computed at 410) in order to determine which advertisement (and its associated bid) is likely to yield the most revenue. For example, in a content segment that has been determined to have an exposure interval of four seconds (such as webpage 322 depicted in FIG. 3B which contains a hyperlink), it can be appreciated that deploying an advertisement associated with a CPM bid yields $0.05 of advertising revenue for the publisher, while deploying an advertisement associated with a CPT bid yields $0.04 of advertising revenue ($0.01/second×4 seconds)—thus, an ad associated with a CPM bid is preferable to an ad associated with a CPT bid in such a content segment. Similarly, in a content segment that has been determined to have an exposure interval of six seconds, it can be appreciated that deploying an ad associated with a CPT bid yields $0.06 of advertising revenue ($0.01/second×6 seconds), while an ad associated with a CPM bid yields $0.05 of advertising revenue—thus, an ad associated with a CPT bid is preferable to an ad associated with a CPM bid under such circumstances. It should also be noted that ad associated with a CPC bid can also be accounted for (that is, considered with respect to determining the ad associated with a particular bid type to deploy within a particular content segment) by converting the CPC bid into an equivalent metric. This can be accomplished, for instance, by multiplying a CPC bid (e.g., $0.15) by a predicted/average click-through rate (CTR) (e.g., 6%), and further multiplying the result by the exposure interval (e.g., four seconds). Accordingly, it can be appreciated that for a content segment having an exposure interval of four seconds, an ad associated with a CPC bid of $0.15/click yields $0.036 of advertising revenue (0.15×0.06×4), while for a content segment having an exposure interval of six seconds, an ad associated with a CPC bid of $0.15/click yields $0.054 of advertising revenue (0.15×0.06×6).

Moreover, in certain implementations, the referenced associations of a particular ad with a particular bid type can include a distribution of one or more ads having various respective bid types (e.g., CPC, CPT, etc.) within one or more content segments. For example, with reference to FIG. 3C, it can be appreciated that content segment 360 (containing media/video content 310 and ad 2) can have a first exposure interval (e.g., six seconds), while a second content segment 370 (containing hyperlinks 330 and ad 1) within the same webpage 342 can have a second exposure interval (e.g., four seconds). Following the example(s) outlined above, it can be appreciated that, with respect to ad slot 346 of content segment 360 (e.g., ad 2), an ad associated with a CPT bid is likely to yield the greatest amount of advertising revenue when deployed in this ad slot, while, with respect to ad slot 344 of content segment 370 (e.g., ad 1), an ad associated with a CPM ad is likely to yield the greatest amount of advertising revenue when deployed therein. Accordingly, it can be further appreciated that by distributing ads associated with CPT bids within ad slot 346 of content segment 360 and ads associated with CPM bids within ad slot 344 of content segment 370, advertising revenues can be maximized across the various content segments (when compared to a deployment ads associated only with CPM bids or ads associated only with CPT bids).

One or more ads are provided in one or more advertising slots (440). In certain implementations, the ads can be provided in response to a determination that an ad associated with one bid type is expected to generate a greater amount of revenue than an ad associated with another bid type (e.g., with respect to a particular ad slot included within a particular content segment), such as in the manner described at 430. Moreover, in certain implementations, the one or more ads can be provided/deployed within a content segment in a manner that optimizes projected revenues generated by the one or more ads, such as in the manner described above. The manner in which the ads are deployed can, in certain implementations, be based on an exposure interval, such as the exposure interval computed at 410.

It should also be noted that in certain implementations, providing/deploying ads within a content segment (e.g., within one or more advertising slots included within a particular content segment) can include providing a suggested arrangement of the ads within the content segment. For example, the publisher of website 342 (as depicted in FIG. 3C) can be presented with one or more suggestions of various arrangements of ads (and their respective associated bid types), such as those referenced above. The publisher can then choose to deploy such suggestions, edit/modify them, and/or reject them.

Additionally, in certain implementations, various ads can be provided/deployed in a manner that accounts for a user profile of the particular user to whom the ads are being deployed. That is, as referenced above at 410, it can be appreciated that users from different groups and/or demographics can have different interests and can interact with/view webpages and ads differently. As such, having identified a user as having a particular profile, ads can be deployed in a manner that accounts for such an identification (e.g., deploying ads having associated bid types in a manner that improves or optimizes revenue generation on account of observed or predicted tendencies about other members of the same group/demographic, such as exposure intervals with regard to various content segments, as described herein).

An association of one or more of the ads is selectively converted from one bid type to another bid type (450). That is, it can be appreciated that the particular advertising objectives of an advertiser can change and/or be dependent upon various budgetary considerations. Moreover, it can be further appreciated that certain bid types, such as CPT bids, can entail a degree of unpredictability with respect to the specific amount an advertiser will be charged for a particular impression of an ad associated with such a bid (as this charge is ultimately determined by the actual amount of time during which a user is exposed to the ad). As such, upon reaching a certain budgetary threshold (e.g., an advertising account of an advertiser falls below a certain threshold, such as a defined amount or a percentage of an original account balance) the association of one or more ads of a particular advertiser can be converted from one bid type to another bid type. For example, once an advertising account of the advertiser falls below a certain threshold the association of one or more ads of a particular advertiser with CPT bids can be converted, such that the ads are associated instead with CPM bids. In converting the respective associations of such ads from CPT bids to CPM bids, an advertiser can potentially increase the predictability of the number of advertising impressions that will be achieved with the remaining advertising account balance (in light of the fact that, in the case of an association with a CPT bid, longer impression periods will deplete the account balance sooner and provide fewer total impression instances). It should also be noted that such a conversion (e.g., converting the association of a particular ad from a CPT bid to a CPM bid) can be achieved using the principles referenced above (at 430) with respect to determining which ad is expected to generate the greatest amount of revenue on the basis of a particular bid associated with the ad and a computed exposure interval.

A monetization rate of a bid is progressively adjusted (460). That is, it can be appreciated that in a scenario where an ad associated with a cost per time unit (CPT) bid is deployed, the amount that the advertiser ultimately pays for a particular instance of deployment of the ad is variable, depending on the amount of time that a user views/is exposed to the ad. It can also be appreciated that in many cases the utility/value of the viewing of the ad by the user diminishes as time goes on. As such, in some implementations the monetization rate (for example, the amount the advertiser pays per time unit) of such CPT bids can be progressively adjusted as time goes on. For example, a CPT bid can be configured to charge a first rate (e.g., $0.01/second) for a first time period (e.g., the first 10 seconds of ad exposure) and a second rate (e.g., $0.005/second) for a second time period (e.g., the following 10 seconds). Moreover, in certain implementations a monetization cap can be imposed on a CPT bid, representing a maximum value that an advertiser can be charged for a single impression (e.g., $0.20). In doing so, the advertiser can be protected from significant charges in scenarios where a user maintains an instance of a page having an ad associated with a CPT bid for a lengthy period of time. It should be noted, however, that while the examples referenced above illustrate scenarios where a monetization rate of an bid decreases as time goes on, in other implementations the monetization rate can be optionally configured to increase as time goes on (e.g., in the case of a video ad where the ongoing viewing of the advertisement is of increasing value to the advertiser).

It should also be noted that in certain implementations the monetization rate of a CPT bid can be progressively adjusted based elements of the content segment within which the associated ad is deployed. For example, in the case of a video ad, there can be certain points within the video that are of greater value/importance to the advertiser than others (e.g., points where a particular product or feature is shown). It can be further appreciated that such points can be flagged or otherwise designated by the advertiser, in a manner known to those of ordinary skill in the art. Accordingly, in certain implementations, certain points/segments of such a video advertisement can be monetized at one rate, while other points/segments of the same video can be monetized at a different rate, owing to the differences in importance/value between the various points/segments.

Additionally, in certain implementations, various ads can be configured to be monetized only if/when the ad is within view of a user. For example, it can be appreciated, with referenced to FIG. 3C, that Ad 3 is not immediately viewable to the user upon arrival at webpage 342. Indeed, in certain scenarios the user may never be exposed to Ad 3 (such as if the user leaves the site or otherwise remains idle without scrolling down). As such, if Ad 3 is associated with a CPT bid, the ad can be configured to charge the advertiser only when Ad 3 is viewable to the user, such as when the user scrolls down webpage 342. If the user subsequently scrolls back up the page (thus re-obscuring Ad 3 from view), a timer (responsible for maintaining the exposure time for ads associated with CPT bids) can effectively pause until the ad returns to view. It should be understood that while the various examples are provided in relation to ads associated with CPT bids, such principles can be similarly applied to other ads, such as ads associated with CPM bids (e.g., an impression is only counted if the ad is actually within view of a user for some period of time).

Figure 5:
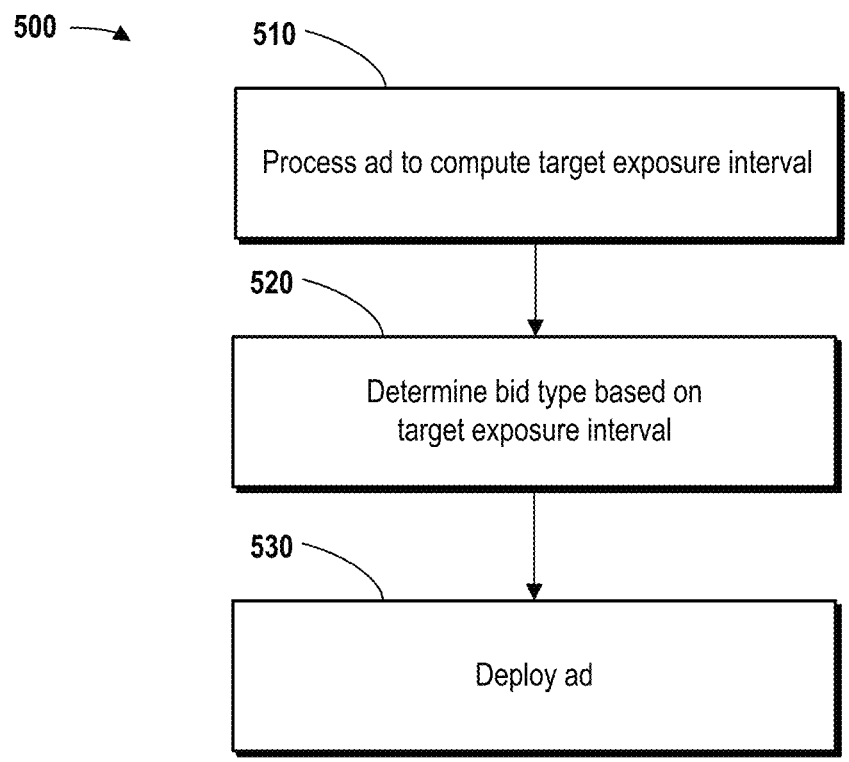
FIG. 5 is a flow chart of an example process setting a bid type.

FIG. 5 is a flowchart of an example method 500 for setting a bid type. In some implementations, the method 500 can be performed by a processor executing instructions in a computer-readable storage medium. For example, the method 500 can be performed by the ad system 204 of FIG. 2.

Figure 6:
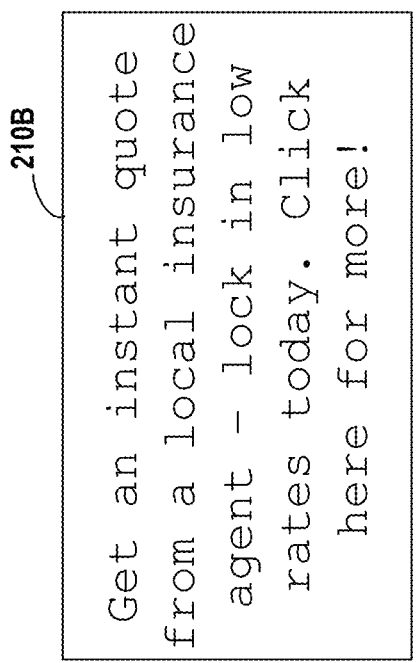
FIG. 6 depicts two exemplary ads.
Figure 6:
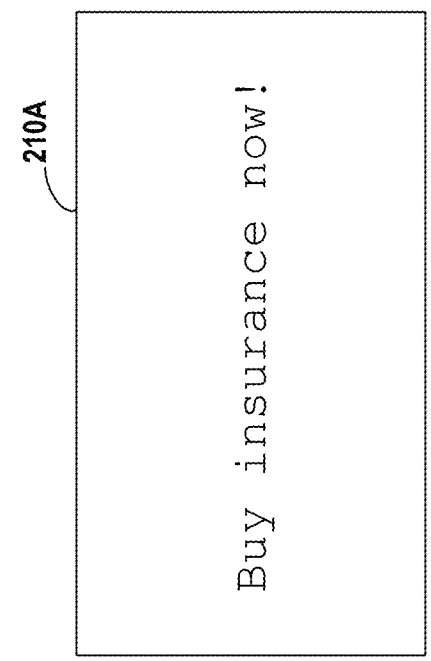

An ad can be processed to compute a target exposure interval (510). It should be understood that a target exposure interval is an ideal or desired time duration for the ad to be presented to/viewable by a user. In certain implementations, the content of one or more of the ads can be analyzed in order to compute a target exposure interval. For example, FIG. 6 depicts exemplary ads 210 and 210B. It can be appreciated, with reference to FIG. 6, that ad 210A ("Buy insurance now!") is considerably shorter (that is, contains fewer words) than ad 210B ("Get an instant quote . . . Click here for more!"). Accordingly, it can be further appreciated that the target exposure interval (that is, the ideal amount of time to display the ad) of ad 210A is likely to be significantly less than the target exposure interval of ad 210B (in light of ad 210A having relatively fewer words than ad 210B and thus requiring relatively less time for the advertising message to be imparted to a user viewing the ad). For example, in one implementation the content of an ad can be analyzed and the target exposure interval can be computed as a function of the number of words in an ad. By way of illustration, every three words in an ad can be defined to be equivalent to one second of a target exposure interval—thus, ad 210A of FIG. 6, having three words, would have a target exposure interval of one second, while ad 210B, having 18 words, would have a target exposure interval of six seconds. By way of further example, in certain implementations the content type of one or more of the ads can be analyzed/considered in order to compute a target exposure interval. For example certain types of ads (e.g., flash ads, interactive ads, etc.) which are intended to elicit relatively longer periods of user viewing/engagement (as compared to text ads, for instance) can be ascribed a certain target exposure interval, while other types of ads (e.g., text ads, banner ads, etc.) can be ascribed a relatively shorter target exposure interval.

An bid type for association with the at least one ad can be determined based on the target exposure interval (520). That is, having determined (such as at 510) the target exposure interval for a particular ad, the target exposure interval can be processed in a manner substantially similar to that described in detail above at 430, whereby various bid types can be processed with the target exposure interval in order to determine which bid type is likely to yield the most revenue when associated with a particular ad.

One or more ads can be deployed as within a webpage (530). In certain implementations, the ad can be deployed in response to a selection of the ad, such as on the basis of a bid type associated with the ad. That is, having determined a bid type to associated with a particular ad (such as at 520), the ad can be deployed to a user, substantially in the manner described in detail above at 440.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 7:
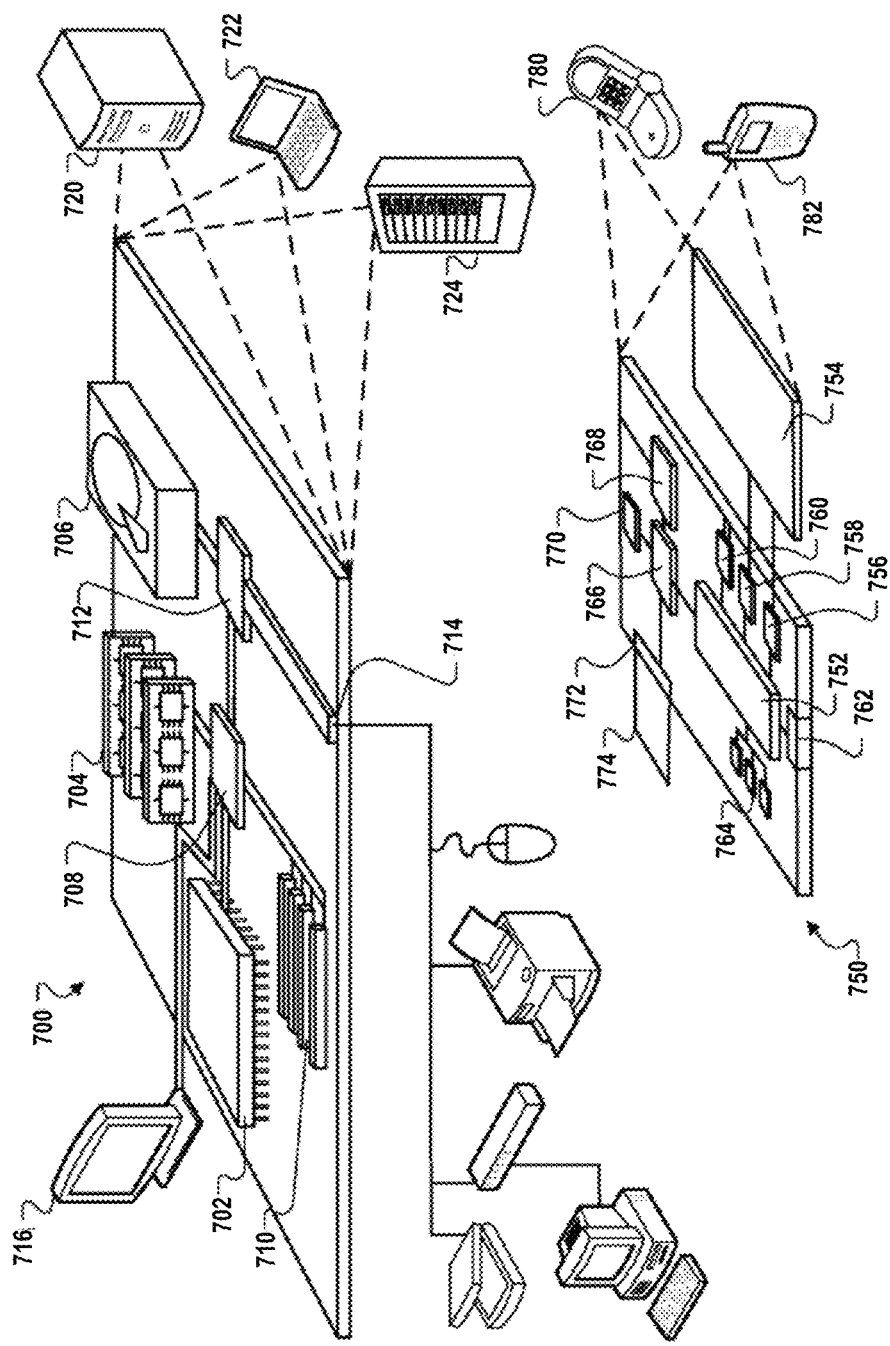
FIG. 7 shows an example of a computing device and a mobile computing device that can be used in connection with computer-implemented methods and systems described in the present specification.

FIG. 7 shows an example of a computing device 700 and a mobile computing device that can be used to implement the techniques described herein the present specification. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, e.g., a computer-readable storage medium such as a floppy disk device, a hard disk device, an optical disk device, or a tape device, a flash memory or other similar solid state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system to deploy content elements to client devices in computer-networked environments, comprising:
    a data processing system having one or more processors to:
        determine a predicted exposure interval of content provided within a content slot of a content segment to be presented on a client device based on an element type of an element on the content segment and a previously determined average exposure interval for a device segment including the client device, the predicted exposure interval indicating an amount of time that the content provided within the content slot of the content segment is likely to be viewed via a viewport of the client device;
        identify a first candidate text content item to be inserted into the content slot of the content segment, the first candidate text content item having a first number of characters and associated with a time-based selection parameter having a value dependent on an amount of time of presentation on the client device;
        identify a second candidate text content item to be inserted into the content slot of the content segment, the second candidate text content item having a second number of characters less than the first number of characters and associated with a non-time-based selection parameter having a value independent of the amount of time of presentation on the client device;

determine a first expected value from providing the first candidate text content item based on the time-based selection parameter and the predicted exposure time interval of content provided within the content slot;

determine a second expected value from providing the second candidate text content item using the non-time-based selection parameter;

determine that the first expected value from providing the first candidate text content item with the first number of characters less than the second number of characters is less than the second expected value from providing the second candidate text content item;

select the second candidate text content item instead of the first candidate text content item responsive to the determination that the first expected value is less than the second expected value; and provide the second candidate text content item for insertion into the content slot of the content segment for presentation on the client device, responsive to the selection of the second candidate text content item instead of the first candidate text content item.

2. The system of claim 1, comprising:
the data processing system configured to:
identify a first number of words from the first candidate text content item;
identify a second number of words from the second candidate text content item;
determine a first target exposure interval for the first candidate text content item based on the first number of words;
determine a second target exposure interval for the second candidate text content item based on the second number of words;
determine the first expected value from providing the first candidate text content item based on the time-based selection parameter, the predicted exposure time interval of content provided within the content slot, and the first target exposure interval; and
determine the second expected value from providing the second candidate text content item based on the non-time-based selection parameter, the predicted exposure time interval of content provided within the content slot, and the second target exposure interval.

3. The system of claim 1, comprising:
the data processing system configured to:
determine a first target exposure interval for the first candidate text content item based on the first number of characters;
determine a second target exposure interval for the second candidate text content item based on the second number of characters;
determine the first expected value from providing the first candidate text content item based on the time-based selection parameter, the predicted exposure time interval of content provided within the content slot, and the first target exposure interval; and
determine the second expected value from providing the second candidate text content item based on the non-time-based selection parameter, the predicted exposure time interval of content provided within the content slot, and the second target exposure interval.

4. The system of claim 1, comprising:
the data processing system configured to:
determine a first target exposure interval for the first candidate text content item based on the first number of characters;
determine a second target exposure interval for the second candidate text content item based on the second number of characters;
associate the first candidate text content item with the time-based selection parameter based on the first target exposure interval; and
associate the second candidate text content item with the non-time-based selection parameter based on the second target exposure interval.

5. The system of claim 1, comprising:
the data processing system configured to:
determine a first target exposure interval for the first candidate text content item based on the first number of characters;
determine a second target exposure interval for the second candidate text content item based on the second number of characters;
determine the first expected value from providing the first candidate text content item based on the time-based selection parameter, the predicted exposure time interval of content provided within the content slot, and the first target exposure interval;
determine a third expected value from providing the first candidate text content item based on the non-time-based selection parameter, the predicted exposure time interval of content provided within the content slot, and the first target exposure interval;
determine that the first expected value is greater than the third expected value;
associate the first candidate text content item with the time-based selection parameter, responsive to the determination that the first expected value is greater than the third expected value;
determine the second expected value from providing the second candidate text content item based on the non-time-based selection parameter, the predicted exposure time interval of content provided within the content slot, and the second target exposure interval;
determine a fourth expected value from providing the second candidate text content item based on the time-based selection parameter, the predicted exposure time interval of content provided within the content slot, and the second target exposure interval;
determine that the second expected value is greater than the fourth expected value; and
associate the second candidate text content item with the non-time-based selection parameter, responsive to the determination that the second expected value is greater than the fourth expected value.

6. The system of claim 1, comprising:
the data processing system configured to:
identify the first candidate text content item to be inserted into the content slot of the content segment, the first candidate text content item initially associated with the non-time-based selection parameter;
identify the second candidate text content item to be inserted into the content slot of the content segment, the second candidate text content item initially associated with the time-based selection parameter;
determine a third expected value from providing the first candidate text content item based on the non-time-based selection parameter and the predicted exposure time interval of content provided within the content slot;
determine that the third expected value exceeds a first constraint for the first candidate text content item;

associate the first candidate text content item with the time-based selection parameter, responsive to the determination that the third expected value exceeds the first constraint;

determine a fourth expected value from providing the second candidate text content item based on the time-based selection parameter and the predicted exposure time interval of content provided within the content slot;

determine that the fourth expected value exceeds a second constraint for the second candidate text content item; and associate the second candidate text content item with the non-time-based selection parameter, responsive to the determination that the fourth expected value exceeds the second constraint.

7. The system of claim 1, comprising:

the data processing system configured to:

identify an actual exposure time of a third candidate text content item provided on a second content slot of the content segment for presentation on the client device, the third candidate text content item associated with the time-based selection parameter; and determine an actual return value for the third candidate text content item based on the time-based selection parameter and the actual exposure time of the third candidate text content item.

8. The system of claim 1, comprising:

the data processing system configured to:

identify a candidate video content item to be inserted into the content slot of the content segment, the second video text content item associated with the time-based selection parameter having the value dependent on the amount of time of presentation on the client device;

determine a third expected value from providing the candidate video content item based on the time-based selection parameter and the predicted exposure time interval of content provided within the content slot;

determine that the third expected value from providing the candidate video content item is less than the second expected value from providing the second candidate text content item; and select the second candidate text content item instead of the first candidate text content item and the second candidate text content item responsive to the determination that the third expected value is less than the first expected value.

9. The system of claim 1, comprising:

the data processing system configured to:

analyze the content segment to identify elements of the content segment and to identify a corresponding element type of each element; and determine the predicted exposure interval based on the corresponding element of type of each element on the content segment.

10. The system of claim 1, comprising:

the data processing system configured to:

identify the first candidate text content item to be inserted into the content slot of the content segment, the first candidate text content item associated with the time-based selection parameter including a cost per time (CPT) unit bid value; and identify the second candidate text content item to be inserted into the content slot of the content segment, the second candidate text content item associated with the non-time-based selection parameter including a non-CPT unit bid value.

11. A method of deploying content elements to client devices in computer-networked environments, comprising:

determining, by a data processing system having one or more processors, a predicted exposure interval of content provided within a content slot of a content segment to be presented on a client device based on an element type of an element on the content segment and a previously determined average exposure interval for a device segment including the client device, the predicted exposure interval indicating an amount of time that the content provided within the content slot of the content segment is likely to be viewed via a viewport of the client device;

identifying, by the data processing system, a first candidate text content item to be inserted into the content slot of the content segment, the first candidate text content item having a first number of characters and associated with a time-based selection parameter having a value dependent on an amount of time of presentation on the client device;

identifying, by the data processing system, a second candidate text content item to be inserted into the content slot of the content segment, the second candidate text content item having a second number of characters less than the first number of characters and associated with a non-time-based selection parameter having a value independent of the amount of time of presentation on the client device;

determining, by the data processing system, a first expected value from providing the first candidate text content item based on the time-based selection parameter and the predicted exposure time interval of content provided within the content slot;

determining, by the data processing system, a second expected value from providing the second candidate text content item using the non-time-based selection parameter;

determining, by the data processing system, that the first expected value from providing the first candidate text content item with the first number of characters less than the second number of characters is less than the second expected value from providing the second candidate text content item;

selecting, by the data processing system, the second candidate text content item instead of the first candidate text content item responsive to determining that the first expected value is less than the second expected value; and providing, by the data processing system, the second candidate text content item for insertion into the content slot of the content segment for presentation on the client device, responsive to selecting the second candidate text content item instead of the first candidate text content item.

12. The method of claim 11, comprising:

identifying, by the data processing system, a first number of words from the first candidate text content item;

identifying, by the data processing system, a second number of words from the second candidate text content item;

determining, by the data processing system, a first target exposure interval for the first candidate text content item based on the first number of words;

determining, by the data processing system, a second target exposure interval for the second candidate text content item based on the second number of words;

determining, by the data processing system, the first expected value from providing the first candidate text content item based on the time-based selection parameter, the predicted exposure time interval of content provided within the content slot, and the first target exposure interval; and determining, by the data processing system, the second expected value from providing the second candidate text content item based on the non-time-based selection parameter, the predicted exposure time interval of content provided within the content slot, and the second target exposure interval.

13. The method of claim 11, comprising:

determining, a first target exposure interval for the first candidate text content item based on the first number of characters;

determining, by the data processing system, a second target exposure interval for the second candidate text content item based on the second number of characters;

determining, by the data processing system, the first expected value from providing the first candidate text content item based on the time-based selection parameter, the predicted exposure time interval of content provided within the content slot, and the first target exposure interval; and determining, by the data processing system, the second expected value from providing the second candidate text content item based on the non-time-based selection parameter, the predicted exposure time interval of content provided within the content slot, and the second target exposure interval.

14. The method of claim 11, comprising:

determining, by the data processing system, a first target exposure interval for the first candidate text content item based on the first number of characters;

determining, by the data processing system, a second target exposure interval for the second candidate text content item based on the second number of characters;

associating, by the data processing system, the first candidate text content item with the time-based selection parameter based on the first target exposure interval; and associating, by the data processing system, the second candidate text content item with the non-time-based selection parameter based on the second target exposure interval.

15. The method of claim 11, comprising:

determining, by the data processing system, a first target exposure interval for the first candidate text content item based on the first number of characters;

determining, by the data processing system, a second target exposure interval for the second candidate text content item based on the second number of characters;

determining, by the data processing system, the first expected value from providing the first candidate text content item based on the time-based selection parameter, the predicted exposure time interval of content provided within the content slot, and the first target exposure interval;

determining, by the data processing system, a third expected value from providing the first candidate text content item based on the non-time-based parameter, the predicted exposure time interval of content provided within the content slot, and the first target exposure interval;

determining, by the data processing system, that the first expected value is greater than the third expected value;

associating, by the data processing system, the first candidate text content item with the time-based selection parameter, responsive to the determination that the first expected value is greater than the third expected value;

determining, by the data processing system, the second expected value from providing the second candidate text content item based on the non-time-based selection parameter, the predicted exposure time interval of content provided within the content slot, and the second target exposure interval;

determining, by the data processing system, a fourth expected value from providing the second candidate text content item based on the time-based selection parameter, the predicted exposure time interval of content provided within the content slot, and the second target exposure interval;

determining, by the data processing system, that the second expected value is greater than the fourth expected value; and associating, by the data processing system, the second candidate text content item with the non-time-based selection parameter, responsive to the determination that the second expected value is greater than the fourth expected value.

16. The method of claim 11, comprising:

identifying, by the data processing system, the first candidate text content item to be inserted into the content slot of the content segment, the first candidate text content item initially associated with the non-time-based selection parameter;

identifying, by the data processing system, the second candidate text content item to be inserted into the content slot of the content segment, the second candidate text content item initially associated with the time-based selection parameter;

determining, by the data processing system, a third expected value from providing the first candidate text content item based on the non-time-based selection parameter and the predicted exposure time interval of content provided within the content slot;

determining, by the data processing system, that the third expected value exceeds a first constraint for the first candidate text content item;

associating, by the data processing system, the first candidate text content item with the time-based selection parameter, responsive to the determination that the third expected value exceeds the first constraint;

determining, by the data processing system, a fourth expected value from providing the second candidate text content item based on the time-based selection parameter and the predicted exposure time interval of content provided within the content slot;

determining, by the data processing system, that the fourth expected value exceeds a second constraint for the second candidate text content item; and associating, by the data processing system, the second candidate text content item with the non-time-based selection parameter, responsive to the determination that the fourth expected value exceeds the second constraint.

17. The method of claim 11, comprising:
identifying, by the data processing system, an actual exposure time of a third candidate text content item provided on a second content slot of the content segment for presentation on the client device, the third candidate text content item associated with the time-based selection parameter; and
determining, by the data processing system, an actual return value for the third candidate text content item based on the time-based selection parameter and the actual exposure time of the third candidate text content item.

18. The method of claim 11, comprising:
identifying, by the data processing system, a candidate video content item to be inserted into the content slot of the content segment, the second video text content item associated with the time-based selection parameter having the value dependent on the amount of time of presentation on the client device;
determining, by the data processing system, a third expected value from providing the candidate video content item based on the time-based selection parameter and the predicted exposure time interval of content provided within the content slot;
determining, by the data processing system, that the third expected value from providing the candidate video content item is less than the second expected value from providing the second candidate text content item; and
selecting, by the data processing system, the second candidate text content item instead of the first candidate text content item and the second candidate text content item responsive to the determination that the third expected value is less than the first expected value.

19. The method of claim 11, comprising:
analyzing, by the data processing system, the content segment to identify the elements of the content segment and to identify a corresponding element type of each element; and
determining, by the data processing system, the predicted exposure interval based on the corresponding element of type of each element on the content segment.

20. The method of claim 11, comprising:
identifying, by the data processing system, the first candidate text content item to be inserted into the content slot of the content segment, the first candidate text content item associated with the time-based selection parameter including a cost per time (CPT) unit bid value; and
identifying, by the data processing system, the second candidate text content item to be inserted into the content slot of the content segment, the second candidate text content item associated with the non-time-based selection parameter including a non-CPT unit bid value.

* * * * *